(12) United States Patent
Breaux et al.

(10) Patent No.: US 12,258,882 B2
(45) Date of Patent: Mar. 25, 2025

(54) PULSATING WATER ENGINE WITH FLOATING FLYWHEEL FOR GENERATING ELECTRICITY

(71) Applicants: Curtis Lynn Breaux, Hemphill, TX (US); Tiffany Lynn Breaux, Hemphill, TX (US); Aziriah Breaux, Hemphill, TX (US)

(72) Inventors: Curtis Lynn Breaux, Hemphill, TX (US); Tiffany Lynn Breaux, Hemphill, TX (US); Aziriah Breaux, Hemphill, TX (US)

( * ) Notice: Subject to any disclaimer, the term of this patent is extended or adjusted under 35 U.S.C. 154(b) by 0 days.

(21) Appl. No.: 18/485,948

(22) Filed: Oct. 12, 2023

(65) Prior Publication Data

US 2024/0125252 A1    Apr. 18, 2024

Related U.S. Application Data

(60) Provisional application No. 63/416,605, filed on Oct. 17, 2022.

(51) Int. Cl.

| *F01K 11/00* | (2006.01) |
| *F03G 6/00* | (2006.01) |
| *F22B 1/00* | (2006.01) |

(52) U.S. Cl.
CPC .............. *F01K 11/00* (2013.01); *F03G 6/083* (2021.08); *F22B 1/006* (2013.01)

(58) Field of Classification Search
CPC .......... F01K 11/00; F03G 6/083; F03G 6/065; F22B 1/006; Y02E 10/46
See application file for complete search history.

(56) References Cited

U.S. PATENT DOCUMENTS

| 3,960,322 | A | * | 6/1976 | Ruff | ........................ | F25B 29/00 |
| | | | | | | 62/236 |
| 4,249,083 | A | * | 2/1981 | Bitterly | .................... | F01K 11/04 |
| | | | | | | 416/DIG. 4 |
| 4,343,296 | A | * | 8/1982 | Franchina | .......... | G05D 23/1924 |
| | | | | | | 126/633 |
| 7,168,252 | B1 | * | 1/2007 | Price | ........................ | F03G 6/062 |
| | | | | | | 60/641.11 |
| 7,735,323 | B2 | * | 6/2010 | Bennett | .................... | F01K 3/008 |
| | | | | | | 60/645 |
| 9,103,328 | B1 | * | 8/2015 | Kilgore | .................... | F24S 25/70 |

* cited by examiner

*Primary Examiner* — Dapinder Singh
(74) *Attorney, Agent, or Firm* — Eversheds Sutherland (US) LLP

(57) ABSTRACT

This disclosure describes systems, methods, and devices related to generating electricity with a water engine. A water engine may include a boiler; a solar oven to retain heat with which the boiler is to heat a liquid to generate steam; a spout extending from the boiler to the liquid, through which the steam passes from the solar oven to the liquid and through which the liquid passes to the solar oven; a floating platform to float on the liquid; and a magnetic rotor operationally connected to the floating platform and to generate electricity by spinning in the liquid.

20 Claims, 8 Drawing Sheets

PULSATING WATER ENGINE WITH FLOATING FLYWHEEL FOR GENERATING ELECTRICITY

CROSS-REFERENCE TO RELATED PATENT APPLICATION(S)

This application claims the benefit of U.S. Provisional Application No. 63/416,605, filed Oct. 17, 2022, the disclosure of which is incorporated herein by reference as if set forth in full.

TECHNICAL FIELD

Embodiments of the present invention generally relate to a water engine that generates electricity.

BACKGROUND

Pulsating water engines boil water, and steam departing via a spout propel the engine through water. Because the spout is submerged in the water, the steam collides with the water and condenses, creating a vacuum, and refilling the engine. However, some pulsating water engines have limitations.

DETAILED DESCRIPTION

Figure 1:
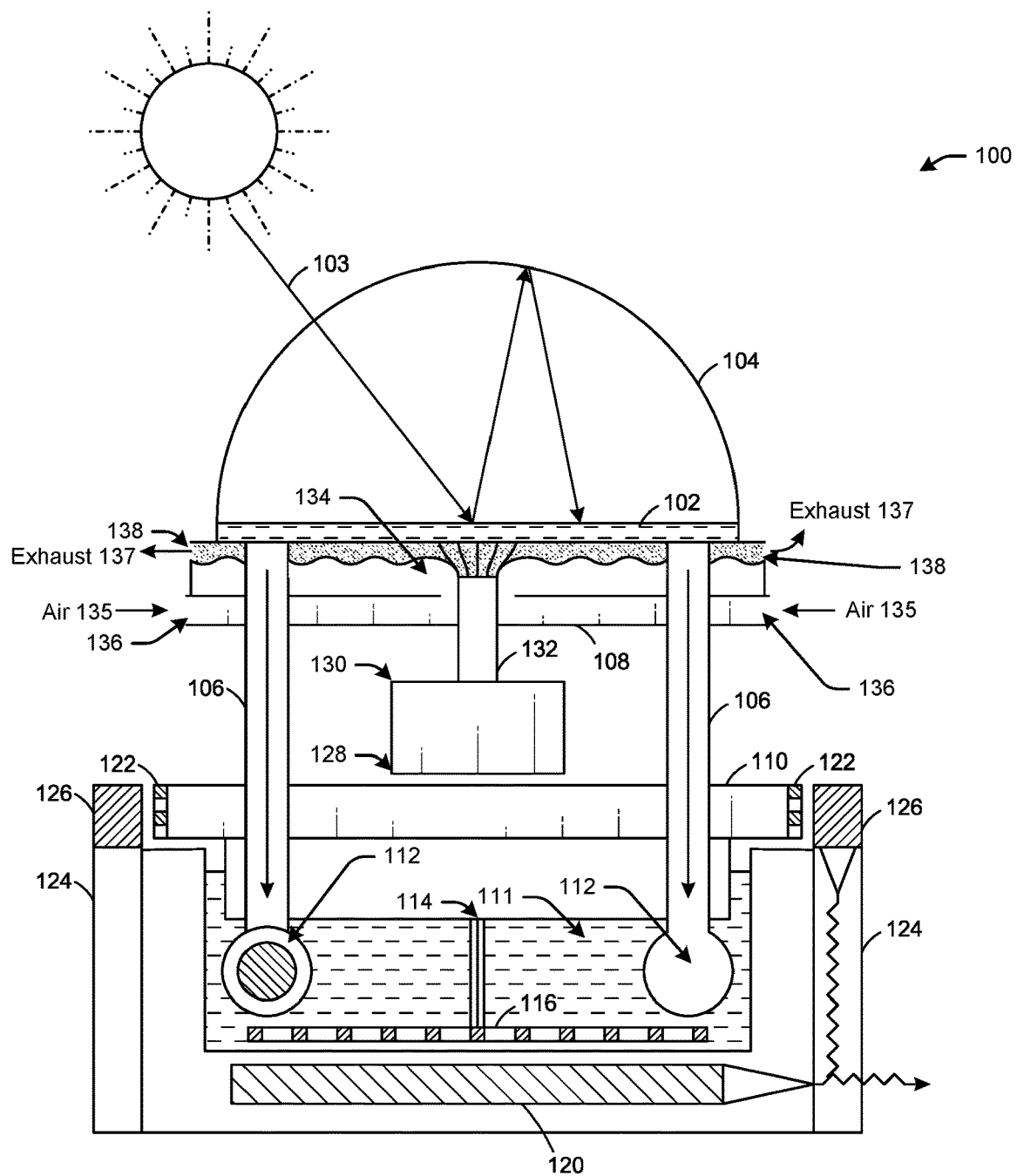
FIG. 1 illustrates an example cross-section view of a water engine for generating electricity in accordance with one embodiment.

Aspects of the present disclosure involve an enhanced pulsating water engine.

A steam engine is meant to boil its water out of its water tank as steam to drive mechanics that then create mechanical/electric power. Eventually, the engine runs dry and needs to be refilled, and most steam engines are "closed-systems," meaning they recycle the water back to their tank after condensation.

In contrast, a pulsating water engine is more like a teapot floating in the water, whose spout leads into the water. It is an open system. As it boils, the steam leaving the spout propels the teapot through the water, but because the spout is submerged the steam collides with the body of water, and the steam condenses and creates a vacuum, refilling the teapot. This oscillation of steam is the "pulsation" of the name pulsating water engine. The engine may only produce forward momentum instead of back-and-forth huffing.

In one or more embodiments, unlike some pulsating water engines, the enhanced pulsating water engine herein may generate electricity, propel water instead of itself, spin instead of moving laterally, be powered by solar heat, be assisted by an evacuated dome, have multiple options for a combustible fuel source, include parabolic minors, floating flywheels, and/or centrifugal systems.

In one or more embodiments, the enhanced pulsating water engine may include an evacuated dome over its boiler, which may combine features of a solar oven and a thermos. This solar oven with an insulating vacuum allows light to enter and heat the boiler but does not allow heat to exit the dome. This heats the water in the boiler up to 200° F. This may be enough to power the device (e.g., the engine) entirely, depending on the intended application, scale, and various factors (such as differences in water temperature). If solar heat is insufficient for the power/scale desired, several variants can be used with an external burner applied to the boiler to produce the meager additional heat needed to reach a boiling point of 212° F. and produce more power. Because that would be only an additional 12° F., the device would still be very fuel-efficient when not running 100% solar. Additionally, due to the insulative dome retaining heat and protecting the boiler from cooling wind, fuel efficiency will be further maximized.

In one or more embodiments, the enhanced pulsating water engine may include a sun-heart with an evacuated dome and diaphragm style, and may be used for boats. In some embodiments, the enhanced pulsating water engine may include may include a tube-boiler sun-heart design.

In one or more embodiments, the enhanced pulsating water engine may include stationary non-floating designs to propel water through conduits for irrigation or hydro-electronics, for example, instead of propelling the engine itself through water.

In one or more embodiments, the enhanced pulsating water engine may include spinning variants with opposing jets, for example. In some embodiments, a spinning variant may use a multi-fuel burner sleeve, a centrifugal exhaust system, a floating flywheel that incorporates a mass of the water in the holding tank, and a magnetically centered rotor/stator assembly.

In one or more embodiments, the enhanced pulsating water engine may use a solar design with a tube-style boiler, incorporating a semi-parabolic minor to focus light onto the boiler.

In one or more embodiments, the enhanced pulsating water engine may include a burner with a receptacle and adjustable chimney-sleeve meant to house different burners (e.g., a propane/butane/methane tank, alcohol or kerosene burner, or the like), allowing for fuel flexibility.

In one or more embodiments, the enhanced pulsating water engine may include a diaphragm boiler, possibly concave in shape, black, and contained inside of a vacuum-insulated solar oven. The diaphragm boiler may include one or more waterspouts, leading away from the boiler the waterspouts pass through the upper and lower chambers of the firebox, then serving as legs for the firebox, boiler, and solar oven before passing through insulated ports in the floating flywheel platform, and into the water. The waterspouts then take opposing turns oriented for circular propulsion before terminating in jets with threaded nozzles, or other appropriate connections for filling or flushing the waterspouts and diaphragm. Central to the jets and mounted in the middle of the floating flywheel may be a central shaft, which may extend to and drives the lower magnetic rotor at the bottom of a small round pool above a lower stator. The floating flywheel also may include an upper magnetic rotor located along the perimeter of the flywheel's upper portion, which may extend further than the lower portion by a safe distance from the water and over the pools edge, thereby creating a "step." The pool may be contained by a second outer higher wall, thereby creating a receptacle for the floating flywheel to stabilize it, and housing for the upper stator recessed in the middle of the floating flywheel platform may be a receptacle for custom or existing styles of removable, refillable, interchangeable fuel tanks with a burner (such as a propane tank, butane tank, biogas tank, pump pressurized alcohol, vegetable oil, or kerosene burner, etc.), or a specifically designed rocket stove cartridge for solid fuel (such as wood, charcoal, or farm waste), secured in the receptacle by magnetic or mechanical means appropriate for scaling. Directly above this, descending from the firebox may be a firebox port, which may serve the burner as a windshield and chimney by resting over it, and which may fit loosely in the firebox be able to slide up and down to accommodate fuel tanks of varying height, and leads through the lower firebox chamber to terminate in the upper firebox combustion chamber beneath the diaphragm boiler. The edge of the lower chamber may be vented with slats, or angled holes (e.g., similar to a cheese grater) arranged to work with the spin of the device as a turbine intake, drawing the air in towards the combustion chamber and pushing exhaust out of a narrow-slit vent along the upper firebox chamber, thus retaining any possible soot or flaming debris.

In one or more embodiments, operation of the enhanced pulsating water engine may include applying heat to the diaphragm boiler through the burner and/or solar oven transmits the heat to the fluid inside until sufficient expansion causes a pulsation to push fluid through the waterspouts and out of the jets, propelling the device as it sits on the floating flywheel in a spin that drives the upper rotor and stator, as well as the central shaft, which in turn drives the lower rotor and stator, thereby creating electrical power (e.g., the stator converts the rotating magnetic field of the rotor to an electrical current). In this manner, the boiler of the device may not be used to produce a continuous jet of steam until its contents are exhausted. Instead, the boiler may produce a cloud of steam or fluid body that pulsates in a rhythm of expansion and contraction which transfers this kinetic force to the surrounding fluid medium. Even if the boiler and waterspouts are fully empty, the resultant vacuum immediately refills it from the surrounding water, which drives the device further forward rather than backward.

In one or more embodiments, forward propulsion of the enhanced engine occurs instead of a static rocking motion due to dynamics of hydraulic force and shockwaves. Practical application, however, does not require a perfect understanding of these observed forces. The nautilus and other aquatic creatures use similar structures and principles to mechanically propel themselves. The expansion-induced propulsion may occur, immediately followed by a vacuum, yet the shockwave produced by that vacuum may more than counteract any drag produced by the vacuum, resulting in only forward propulsion or spinning propulsion.

In one or more embodiments, the solar oven's interior may be vacuum sealed to prevent heat loss from the top of the diaphragm boiler, and parabolic or "beehive shaped" to reflect lost heat back towards the diaphragm. As sunlight enters the transparent solar oven, light strikes the diaphragm boiler and heat is produced (despite the vacuum) via radiation. This heat is also retained by the vacuum and solar oven and builds up in the boiler, assisting or replacing the burner below as necessary. The vacuum inside the solar oven also protects the diaphragm from cooling due to airflow created by operation, as well as muffling the noise of the diaphragm boiler.

In one or more embodiments, the rotors may center themselves central to the stators due to magnetic attraction to materials in the stator, as well as the stabilizing effect of the whirlpool vortex created in the pool during operation.

In one or more embodiments, as the device heats up and attains speed, the motion of the device may be transmitted via viscous action to the liquid inside the round pool, which may produce a centripetal kinetic whirlpool effect or forced vortex. After sufficient time, the fluid may spin as a practically solid body with the floating flywheel. This may reduce the friction between the device and the liquid, thus lowering the energy required to maintain spin and making more efficient use of fuel, and acts an extension to the flywheel, (or more specifically, a cob of yarn joining the whorl of a spindle and increasing its mass and kinetic energy), which stabilizes the spin and puffing propulsion of the device, and provides assistive momentum during momentary lapses in power, keeping energy production more continuous. The process of the device cycling up and gaining the mass of the water can be compared to increasing bike gears as one increases speed to make better use of energy.

In one or more embodiments, as the device spins, the turbine intake vents on the lower firebox chamber may funnel air inward to the combustion chamber (optionally with the help of stator conduits) and out the exhaust vents to maximize combustion. By funneling the air inward, these turbine vents fight centrifugal force that otherwise would slow down air flow to the combustion chamber, reducing fuel efficiency and creating excess soot. Updraft airflow is also aided via the lower opening of the firebox port into which the burner sets.

In one or more embodiments, a fire tornado created by the device may not rise indeterminately, but rather may strike the center of the diaphragm boiler and is forced outward from there, encountering centrifugal force and spreading across the surface of the boiler as air is forced out the exhaust by both the turbine intakes and updraft of the combustion chamber below. Additionally, when the device spins, any liquid or liquefied gas fuel used may also spin inside of its container, creating and maintaining additional pressure inside the fuel tank, which may be especially useful for pressurized liquid fuels like alcohol, vegetable oils, or kerosene, thereby maximizing fuel combustion efficiency, and extending the time needed before re-pressurization.

In one or more embodiments, the enhanced pulsating water engine may provide a variety of benefits with respect to existing engines, such as improved engine efficiency, cleaner operation, improved sustainable energy production with minimal maintenance, moving parts, pollution, and noise. Compared to solar-thermal power generators, the enhanced designs herein are smaller and less complex. Compared to hydroelectric power generators, the enhanced designs herein are more environmentally friendly. Compared to photovoltaic solar panels, the enhanced designs herein are more efficient and smaller. Compared to wind-powered generation, the enhanced designs herein are more efficient and smaller.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example cross-section view of a water engine 100 for generating electricity in accordance with one embodiment.

Referring to FIG. 1, the water engine 100 may include a diaphragm boiler 102, which may be concave in shape, and may receive sunlight 103. The diaphragm boiler 102 may be inside of a vacuum-insulated solar oven 104, in which the sunlight 103 may reflect. The solar oven 104 may include waterspouts 106 extending away from the diaphragm boiler 102, passing through upper and lower chambers of a firebox 108, and serving as legs for the firebox 108, the diaphragm boiler 102, and the solar oven 104 before passing through insulated ports in a floating flywheel platform 110 and into water 111. The waterspouts 106 may take opposing turns oriented for circular propulsion before terminating in jets with threaded nozzles 112 or other connections for filling or flushing the waterspouts 106 and the diaphragm boiler 102. Central to the jets and mounted in the middle of the floating flywheel platform 110 may be a central shaft 114, which may extend to and drive a lower magnetic rotor 116 at the bottom of the water 111 above a lower stator 120.

Still referring to FIG. 1, the flywheel platform 110 may include an upper magnetic rotor 122 located along a perimeter of an upper portion of the flywheel platform 110, and which may extend further than the lower portion of the flywheel platform 110 by a safe distance from the water 111 and over the water 111. The water 111 may be contained by an outer higher wall 124, thereby creating a receptacle for the flywheel platform 110 to be stabilized, and to house an upper stator 126. Recessed in the middle of the floating flywheel platform 110 may be a receptacle 128 for styles of removable, refillable, and/or interchangeable fuel tanks with a burner 130 (e.g., a propane tank, a butane tank, a biogas tank, pump pressurized alcohol, vegetable oil, a kerosene burner, or the like), or a rocket stove cartridge for solid fuel (e.g., wood, charcoal, farm waste, etc.), secured in the receptacle 128 by magnetic and/or mechanical. Above the receptacle 128, descending from the firebox 108, may be a firebox port 132, which may serve the burner 130 as a windshield and chimney by resting over the firebox 108, fitting loosely in the firebox 108 to be able to slide up and down to accommodate fuel tanks of varying height. The firebox port 132 may lead through the lower firebox 108 chamber to terminate in the upper firebox 108 combustion chamber 134 beneath the diaphragm boiler 102. Air 135 may flow through an edge of the lower chamber 136 via slats (e.g., angled holes/vias) arranged to work with the spin of the water engine 100 as a turbine intake, drawing the air 135 in toward the combustion chamber 134 and pushing exhaust 137 out of a narrow-slit vent along an upper firebox chamber 138, thereby retaining soot or flaming debris.

In one or more embodiments, the water engine 100 may operate by applying heat (e.g., from the sunlight 103) to the diaphragm boiler 102 through the burner 130, and/or the solar oven 104 may transmit the heat to fluid (e.g., the water 111) until sufficient expansion causes a pulsation to push fluid through the waterspouts 106 and out of the jets, propelling the water engine 100 as it sits on the floating flywheel platform 110 in a spin that drives the upper magnetic rotor 122 and the upper stator 126, as well as the central shaft 114, which in turn may drive the lower magnetic rotor 116 and the lower stator 120, thereby generating electrical power.

In one or more embodiments, the diaphragm boiler 102 does not need to produce a continuous jet of steam until its contents are exhausted. The diaphragm boiler 102 may produce a cloud of steam or fluid body that pulsates in a rhythm of expansion and contraction, which transfers the kinetic force to the surrounding fluid medium. Even when the diaphragm boiler 102 and the waterspouts 106 are empty, the resultant vacuum immediately may refill the diaphragm boiler 102 and the waterspouts 106 from the water 111, which may drive the water engine 100 forward rather than backward. Forward propulsion may occur instead of a static rocking motion due to dynamics of hydraulic force and shockwaves, for example.

In one or more embodiments, the solar oven 104 interior may be vacuum-sealed to prevent heat loss from the top of the diaphragm boiler 102, for example, parabolic or "beehive shaped" to reflect lost heat back toward the diaphragm boiler 102. As the sunlight 103 enters the solar oven 104 (e.g., because the solar oven 104 may be transparent), the sunlight 103 may strike the diaphragm boiler 102 to produce heat via radiation. The heat may be retained by the vacuum of the solar oven 104 and may build inside the diaphragm boiler 102, assisting or replacing the diaphragm boiler 102 in function. The vacuum inside the solar oven 104 may protect the diaphragm from cooling due to airflow created by operation, as well as muffling noise of the diaphragm boiler 102.

In one or more embodiments, the rotors (e.g., the lower magnetic rotor 116, the upper magnetic rotor 122) may center themselves central to the stators (e.g., the lower stator 120 and the upper stator 126) due to magnetic attraction to materials in the stators, as well as the stabilizing effect of the whirlpool vortex created in the water 111 during operation.

In one or more embodiments, as the water engine 100 heats up and attains speed, the motion of the water engine 100 may be transmitted via viscous action to the water 111, which may produce a centripetal kinetic whirlpool effect or forced vortex. After sufficient time, the water 111 may spin as a practically solid body with the floating flywheel platform 110, reducing the friction between the water engine 100 and the water 111, thereby lowering the energy required to maintain spin, making more efficient use of fuel, and acting as an extension to the flywheel platform 110, stabilizing the spin, puffing propulsion of the water engine 100, and providing assistive momentum during momentary lapses in power and keeping energy production continuous. The process of the water engine 100 cycling up and gaining the mass of the water 111 may be similar to increasing bicycle gears as the bicycle increases speed.

In one or more embodiments, as the water engine 100 spins, the turbine intake vents of the lower chamber 136 may funnel the air 135 inward to the combustion chamber 134 (and optionally with help of stator conduits) and out the exhaust vents to maximize combustion. By funneling the air 135 inward, the turbine vents of the lower chamber 136 may fight centrifugal force that otherwise may slow down air flow to the combustion chamber, reduce fuel efficiency, and create excess soot. Updraft airflow may be aided via the lower opening of the firebox port 132 into which the burner 130 sets.

In one or more embodiments, the fire tornado created by the water engine 100 may not rise indeterminately, and may strike the center of the diaphragm boiler 102 and be forced outward, encountering centrifugal force and spreading across the surface of the diaphragm boiler 102 as the air 135 is forced out the exhaust 137 by both the turbine intakes of the upper chamber 138 and updraft of the combustion chamber 134 below.

In one or more embodiments, when the water engine 100 spins, any liquid or liquefied gas fuel used also may spin inside of its container, creating and maintaining additional pressure inside the fuel tank, thereby maximizing fuel combustion efficiency and extending the time needed before re-pressurization.

Figure 2:
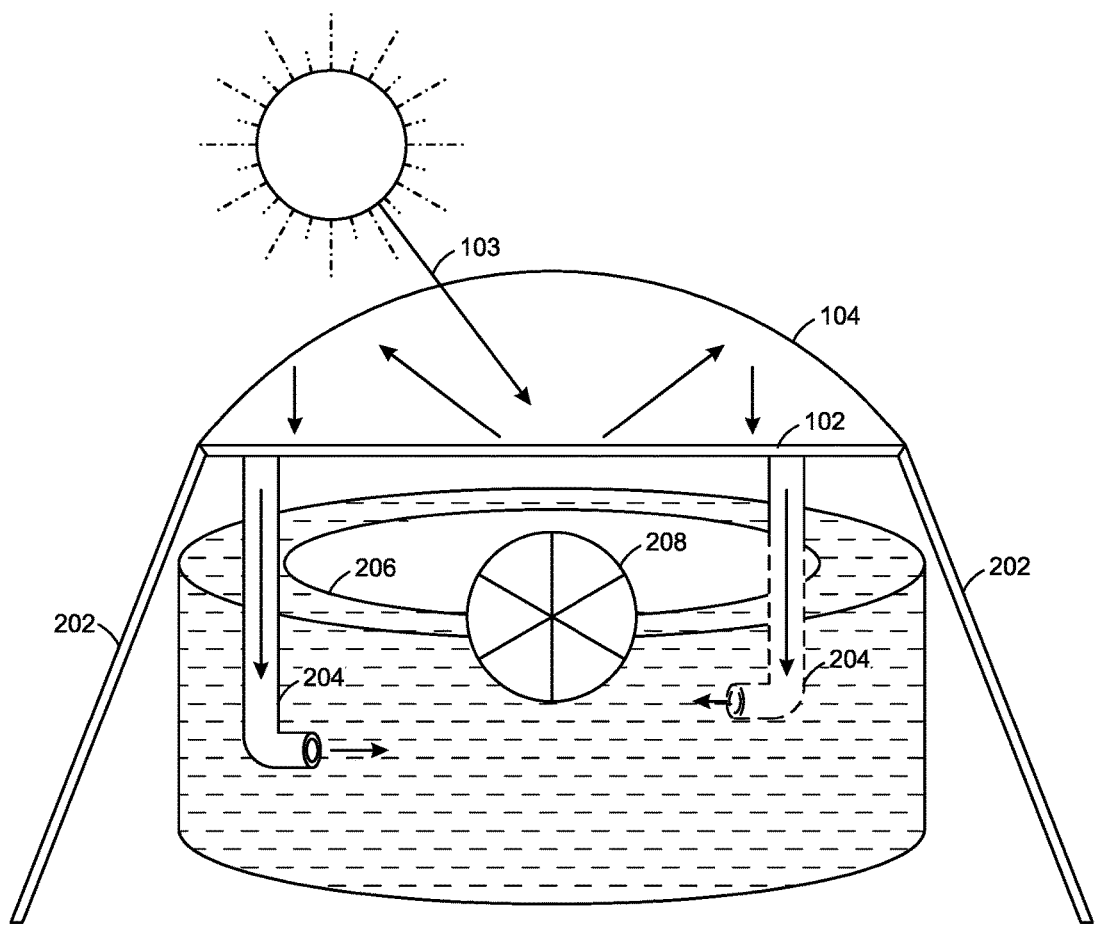
FIG. 2 illustrates an example water engine for generating electricity in accordance with one embodiment.

FIG. 2 illustrates and example water engine 200 for generating electricity in accordance with one embodiment.

Referring to FIG. 2, the water engine 200 may include the diaphragm boiler 102 and the solar oven 104 of FIG. 1, and also may include support mechanisms 202 (e.g., legs) for a stationary variant of the water engine 100. The water engine 200 also may include waterspouts 204 extending below the diaphragm boiler 102 and into a body of water 206, operating as described with respect to FIG. 1 to propel the body of water 206 and/or a hydroelectric paddlewheel or mill 208.

Figure 3A:
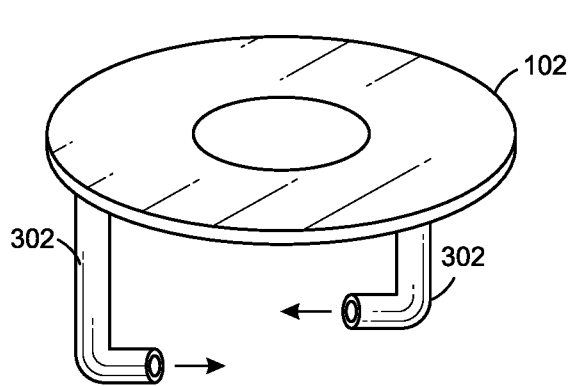
FIG. 3A illustrates a waterspout configuration for an example water engine for generating electricity in accordance with one embodiment.

FIG. 3A illustrates a waterspout configuration 300 for an example water engine for generating electricity in accordance with one embodiment.

Figure 3B:
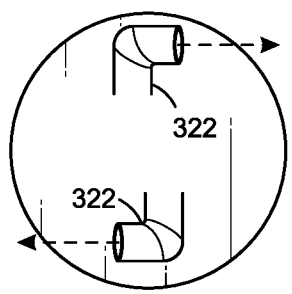
FIG. 3B illustrates a waterspout configuration for an example water engine for generating electricity in accordance with one embodiment.

FIG. 3B illustrates a waterspout configuration 320 for an example water engine for generating electricity in accordance with one embodiment.

Figure 3C:
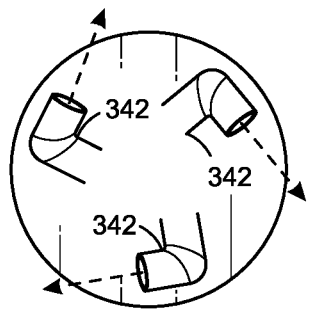
FIG. 3C illustrates a waterspout configuration for an example water engine for generating electricity in accordance with one embodiment.

FIG. 3C illustrates a waterspout configuration 320 for an example water engine for generating electricity in accordance with one embodiment.

Figure 3D:
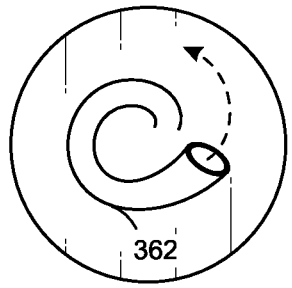
FIG. 3D illustrates a waterspout configuration for an example water engine for generating electricity in accordance with one embodiment.

FIG. 3D illustrates a waterspout configuration 320 for an example water engine for generating electricity in accordance with one embodiment.

Referring to FIGS. 3A-3D, the waterspout configurations may apply to any of the waterspouts of any of the figures and embodiments herein and produce rotation in any of the water engines shown in the other figures.

In FIG. 3A, waterspouts 302 extend down from the diaphragm boiler 102 of FIG. 1 (e.g., into the water 111) to push fluid and propel the engine with which they are associated. The waterspouts 302 are oriented such that the liquid may flow through them in different directions (e.g., one to the left on the page, one to the right on the page) because the respective waterspouts 302 are each oriented in the different horizontal directions, even if oriented in the same vertical directions. The different lengths and orientations of the waterspouts 302 allow for liquid flowing through them to exit and flow in different directions to facilitate the propulsion.

In FIG. 3B, waterspouts 322 are oriented in both different horizontal and vertical directions with respect to one another. For example, one of the waterspouts 322 (e.g., toward the top of the page) is oriented upward toward the top of the page and horizontally to the right of the page, whereas the other of the waterspouts 322 (e.g., toward the bottom of the page) is oriented downward and horizontally to the left of the page. The different lengths and orientations of the waterspouts 322 allow for liquid flowing through them to exit and flow in different directions to facilitate the propulsion.

In FIG. 3C, there are three waterspouts 342 oriented at different angles both horizontally and vertically so that the liquid flows out of them at different vertical and horizontal angles. The different lengths and orientations of the waterspouts 342 allow for liquid flowing through them to exit and flow in different directions to facilitate the propulsion.

In FIG. 3D, a waterspout 362 is curved in a circular manner so that the liquid flowing out of the waterspout 362 flows in a circular manner for the propulsion, reducing the number of waterspouts needed.

Figure 4:
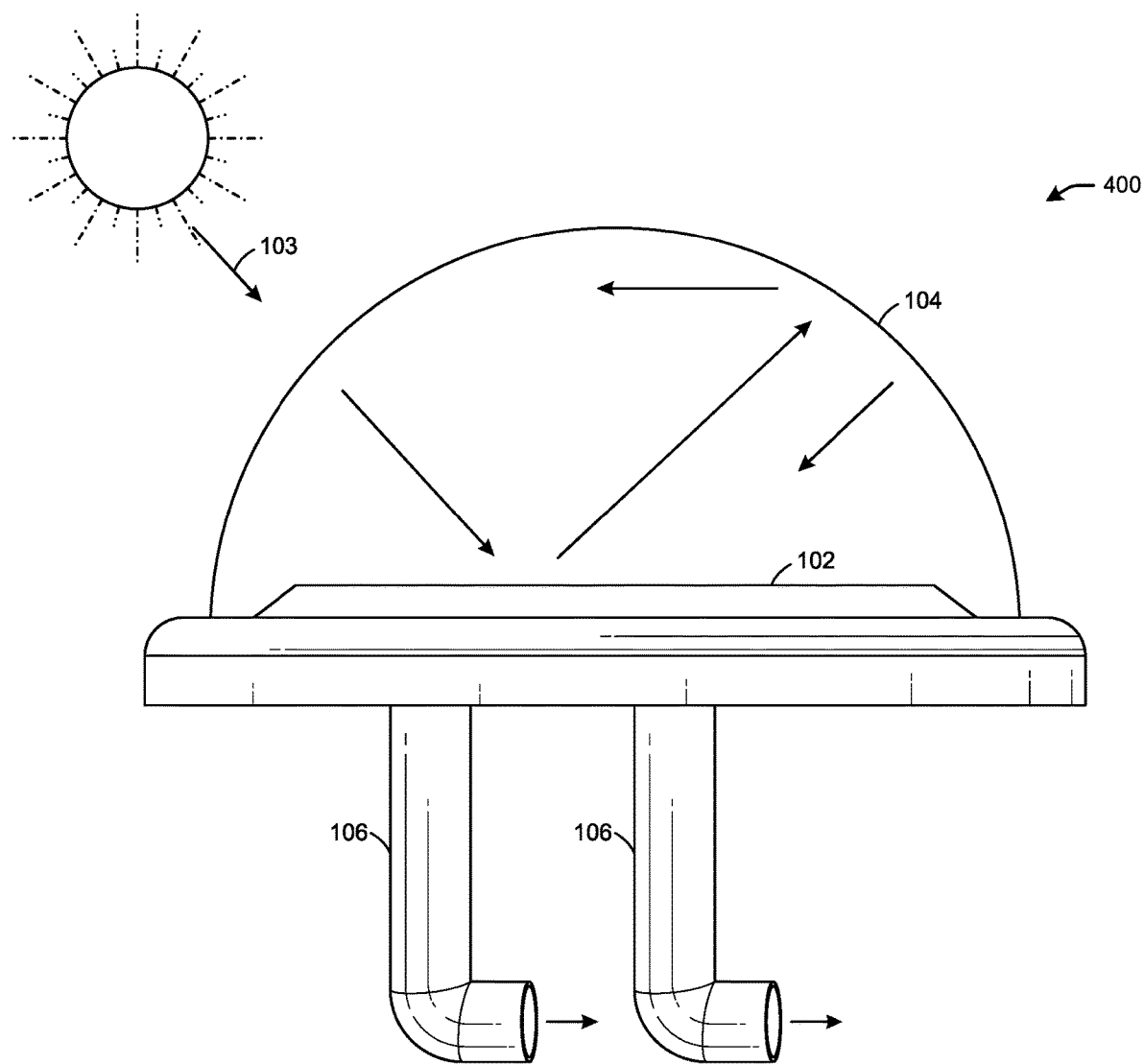
FIG. 4 illustrates an example water engine for generating electricity in accordance with one embodiment.

FIG. 4 illustrates an example water engine 400 for generating electricity in accordance with one embodiment.

The water engine 400 may represent a stripped-down version of the water engine 100 of FIG. 1, for example, in which the water engine 400 does not spin. The water engine 400 may include the diaphragm boiler 102, the solar oven 104 for receiving the sunlight 103, the burner 130 (not shown in FIG. 4), and the waterspouts 106 oriented to propel water for paddlewheel electric generation or otherwise propel water. The water engine 400 may be referred to as a non-spinning or "sun heart" engine in which, instead of spinning itself, it may be fixed in place (e.g., on supports or a dock) with the waterspouts 106 used to power one or more turbines, drums, platforms, and/or paddlewheels, thereby mechanically driving a rotor inside or outside of water.

Figure 5:
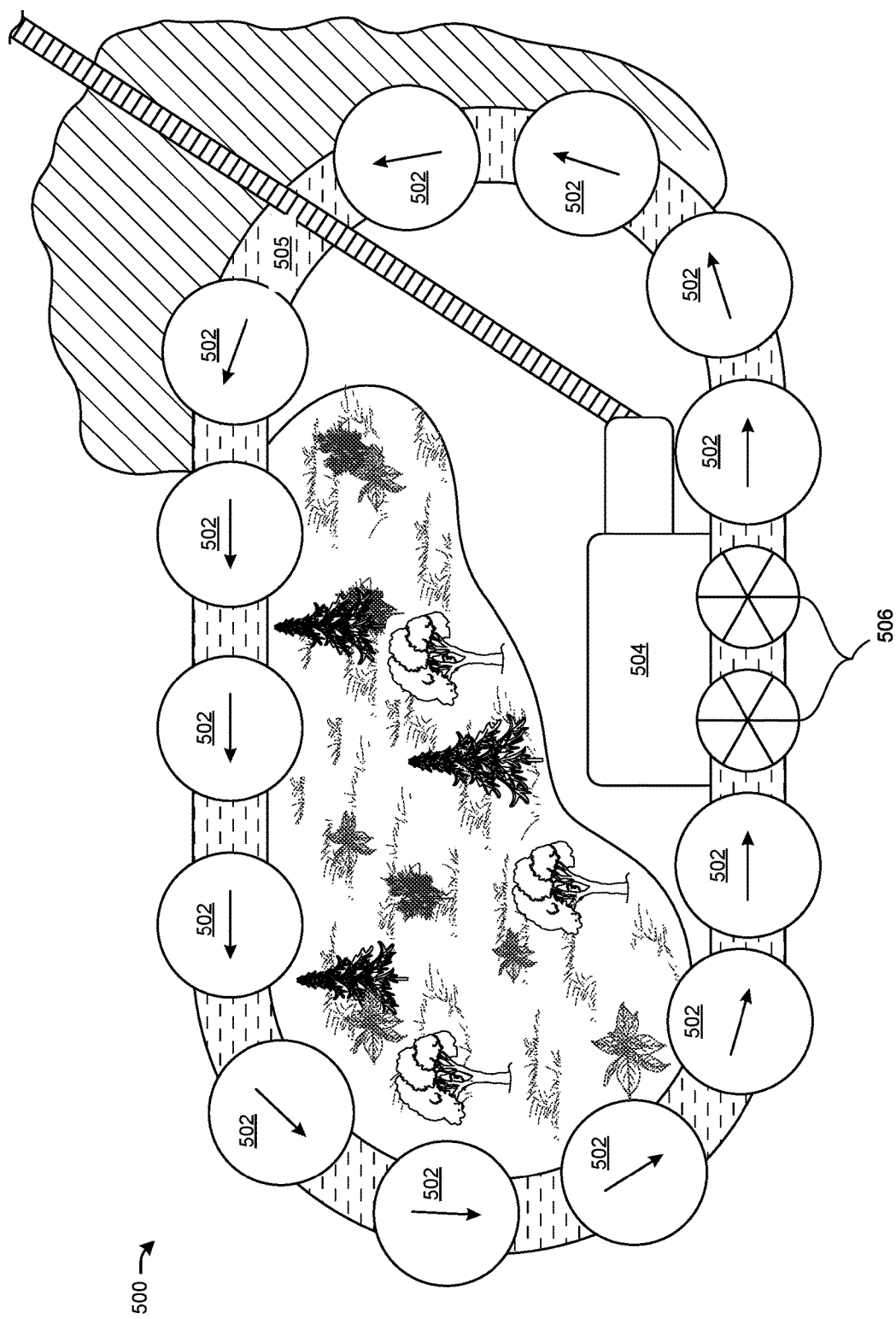
FIG. 5 illustrates an example system of water engines for generating electricity being daisy chained together in accordance with one embodiment.

FIG. 5 illustrates an example system 500 of water engines 502 for generating electricity being daisy chained together in accordance with one embodiment.

Referring to FIG. 5, the water engines 502 may represent any of the water engines show in any of the figures herein, and may be daisy chained together to produce electricity for a power plant or other facility 504. The water engines 502 may propel water 505 to facilitate electricity using paddlewheels or turbines 506 in the manner described above.

In one or more embodiments, to non-electrically combine the water engines 502, any number of non-spinning engines may be oriented with waterspouts pumping in complimentary fashion, providing liquid current and driving one or more rotors via the paddlewheels or turbines 506 (or any other hydroelectric waterworks implemented). The combination of the water engines 502 allows for scalability and improved nearby ecosystem.

Figure 6:
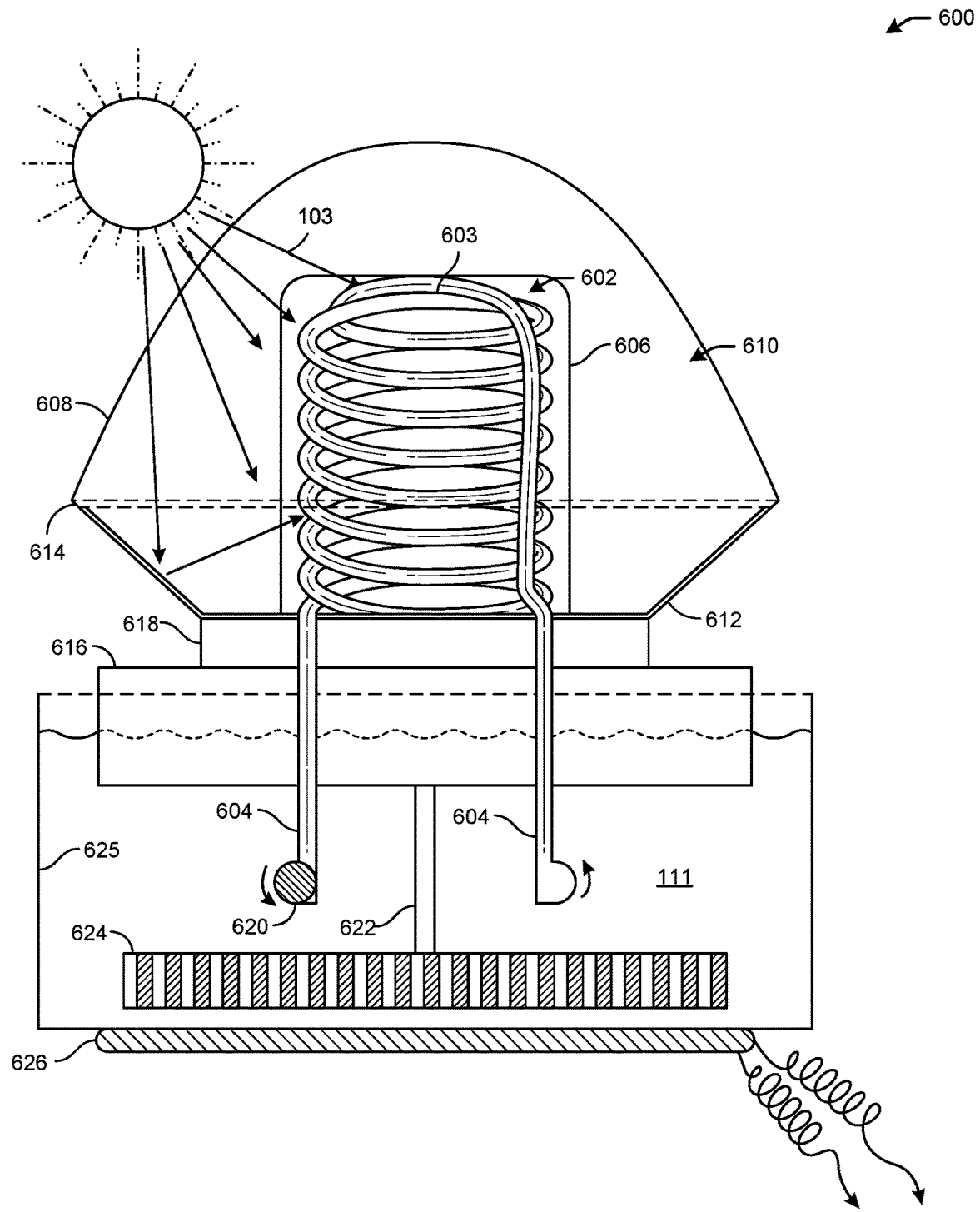
FIG. 6 illustrates sun heart water engine for generating electricity in accordance with one embodiment.

FIG. 6 illustrates sun heart water engine 600 for generating electricity in accordance with one embodiment.

Referring to FIG. 6, the sun heart water heater engine 600 may include a coil boiler engine 602 (boiler) with coils 603 leading to one or more waterspouts or jets 604 oriented for circular propulsion, fitted with an interior solar oven 606 contained within a larger exterior solar oven 608. The interior solar oven 606 and the exterior solar oven 608 may be parabolic or "beehive shaped" for heat retention and focus. The space 610 within the exterior solar oven 608 may be under vacuum, atmospheric pressure, or may contain oil, liquid, or gas to aid heat transfer. The exterior solar oven 608 may be mounted on a parabolic reflector 612 with a gasket seal 614. Combined together, the coil boiler engine 602, the exterior solar oven 608, the waterspouts or jets 604, the interior solar oven 606, and the parabolic reflector 612 may be mounted upon an insulated flotation platform 616 via a mounting gasket 618. The waterspouts or jets 604 may extend through the mounting gasket 618 and the insulated flotation platform 616, and may terminate in jets, threaded nozzles 620, or other appropriate connections for filling, flushing, or sealing the waterspouts or jets 604. The insulated flotation platform 616 may be connected at the center to a central shaft 622, which may drive a thin magnetic rotor 624 as the water heater engine 600 spins inside water 625. Beneath or within the water 625 may be a tightly coiled stator 626, which may center the magnetic rotor 624 and may include terminals with which to transmit the power produced (e.g., to provide power to other machines and/or facilities).

Still referring to FIG. 6, as the sunlight 103 enters the water engine 600 through the exterior solar oven 608 and the interior solar oven 606 to strike the coil boiler engine 602, heat may be retained by the walls of the solar ovens and built up in the coil boiler engine 602. The exit of heat from the water engine 600 may be resisted by insulative properties of the vacuum inside the exterior solar oven 608, which may protect the interior solar oven 606 and coils 603 of the coil boiler engine 602 from cooling due to airflow. Retained heat may be transferred to the flued (e.g., the water 625) inside the coils 603 of the coil boiler engine 602.

In one or more embodiments, when the space inside the interior solar oven 606 is filed with fluid, the interior solar oven 606 may aid the retention of heat during intermittent sunlight 103, transfer of heat to the coils 603 of the coil boiler engine 602, and potentially aid refraction of light into the coil's contents. The coils 603 of the coil boiler engine 602 may heat the fluid within until sufficient expansion causes it to push the fluid out of the waterspouts or jets 604, propelling the water engine 600 as it sits on the insulated flotation platform 616 in a spin that drives the central shaft 622 and the submerged magnetic rotor 624, and may drive the stator 626 arranged beneath the water 111, creating electrical power.

Figure 7:
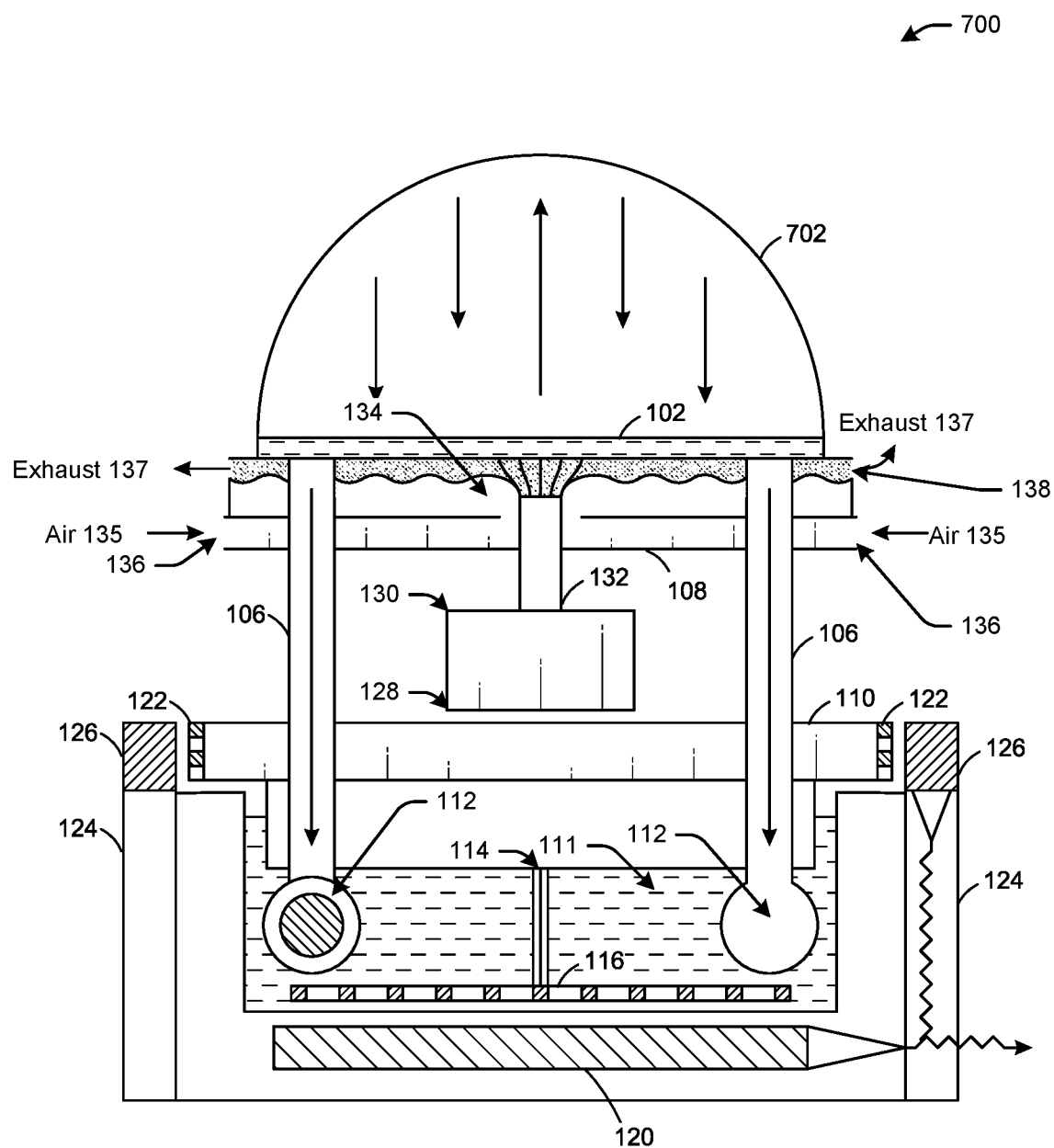
FIG. 7 illustrates an example water engine for generating electricity in accordance with one embodiment.

In one or more embodiments, the interior solar oven 606 is shown as being transparent to allow passage of the sunlight 103 through the interior solar oven 606, but the interior solar oven 606 may be non-transparent as described with respect to FIG. 7.

In one or more embodiments, there is no burner or firebox in FIG. 6 like there is in FIG. 1 because they may not be necessary with the configuration of FIG. 6.

FIG. 7 illustrates an example water engine 700 for generating electricity in accordance with one embodiment.

The water engine 700 may represent the water engine 100 of FIG. 1, but with an opaque version of the solar oven 104 (e.g., an opaque or otherwise non-transparent solar oven 702). When the non-transparent solar oven 702 is used to maintain a vacuum, it may provide an insulative shield for the diaphragm boiler 102, excluding solar light and heat, which may be desirable in some aspects of the present disclosure. The non-transparent solar oven 702 may shield the diaphragm boiler 102 from wind-chill and prevent heat from escaping the top surface of the diaphragm boiler 102.

When no vacuum is employed by the non-transparent solar oven 702, solar heat (but not light) may be admitted and retained in the non-transparent solar oven 702. However, the heat loss from the diaphragm boiler 102 may be greater than potential gains from solar-thermal heat, depending on device location.

In one or more embodiments, when the interior solar oven 606 of FIG. 6 is non-transparent and does not use a vacuum, and when the exterior solar oven 608 is transparent, the exterior solar oven 608 will allow heat and light to pass through and be absorbed by the interior solar oven 606, and transfer the heat inward to the coil boiler engine 602. Alternatively, the coil boiler engine 602 may be non-transparent, and the interior solar oven 606 may be omitted.

In one or more embodiments, a diaphragm (e.g., the diaphragm boiler 102 of FIG. 1) or coil boiler (e.g., coil boiler 602 of FIG. 6) of the figures herein may be transparent or opaque. When boiler coils (e.g., the coils 603 of FIG. 6) are transparent, it may be desirable to use transparent solar ovens to allow sunlight to penetrate through them, through the coil boilers, and enter the water to be heated inside. If a non-transparent coil or diaphragm boiler is used, light cannot enter the water inside the coils, but heat absorption may be assisted when the boiler is dark in color or includes a highly conductive metal (e.g., copper). In either transparent or non-transparent boiler variants, a vacuum may be employed inside the exterior solar oven to act as an insulative barrier to outside wind and promote heat retention within.

In one or more embodiments, contents of any of the boiler and solar ovens of the figures herein may be under vacuum, pressurized, or vented, containing regular air, oil, gas, liquid, or the like. The number of solar ovens employed and how they are layered may vary (e.g., as shown in some of the embodiments with one or multiple ovens).

In one or more embodiments, for any of the figures herein, it may be desirable to dye the water (or other liquid used) black and/or add salt to it to facilitate heat absorption, especially when using a transparent exterior solar oven, a transparent interior solar oven, and/or transparent boiler coils (e.g., the coils 603 of FIG. 6). When water is used, the water may be salted or unsalted to regulate heat retention, boiling/freezing points, and buoyancy. The body of water may be contained or an open body of water.

In one or more embodiments, for any of the figures herein, whether the interior solar oven is transparent or not, it may be desirable to fill the solar oven with a light oil or other liquid to aid heat transfer from the walls of the interior solar oven to the boiler, and potentially aid light refraction between the inner solar oven and boiler and the liquid inside (e.g., if using a transparent coil boiler).

In one or more embodiments, for any of the figures herein, it may be desirable to add another magnetic rotor (not shown in the figures) beneath the water to link up magnetically with the original magnetic rotor, matching its movement and extending the magnetic field to the stator located below each of the magnetic rotors.

In one or more embodiments, for any of the figures herein, a magnetic torque coupling may drive the rotor(s) or a transmission system outside of the water. It may be desirable to position the magnetic rotor (or additional rotors) outside of the water and/or below a portion of the device. In one or more embodiments, for any of the figures herein, a rotor may be made to drive other gears, an automatic CVT (continuously variable transmission), or other speed-adjusting transmission, which in turn may drive a separate magnetic rotor to maintain the desired rotational speed of the magnetic rotor and/or when device spin is irregular due to temperature or other factors (e.g., despite the flywheel effect of the vortex).

In one or more embodiments, to maximize solar efficiency for the designs any of the figures herein, a removable or permanently installed white or mirrored parabolic reflector may be placed over and around the solar oven (e.g., referring to FIG. 6), or just above the upper fire box when used. Alternatively, external reflectors may be arranged to focus on the device's solar over and/or boiler. If the parabolic reflector is included, the solar oven may be extended to the edge of the parabolic reflector (e.g., referring to FIG. 6) and using a low point of focus aimed at the solar oven and/or boiler to protect users and nearby wildlife, and to protect the reflector from soot. The parabolic reflector and/or any other reflectors used may be located externally and separate from the device, focused on the boiler.

In one or more embodiments, for any of the figures herein, it may desirable (e.g., in situations demanding high, variable voltage) to use electromagnetic rotors instead of a permanent magnet arrangement. When the rotors are electromagnetic, several options may be used to power them: (1) Use a small amount of heat from the device through Peltier tiles (or a small onboard Stirling engine generator) to power them; (2) place photovoltaic solar panels over the insulated flotation platform to charge the electromagnetic rotors via an onboard lithium ion battery; (3) a smaller additional rotor-stator arrangement contrary to the device's spin may be located at the connection of the central shaft and the insulated flotation platform, or alternatively placed at the main rotor and shaft anchor when used.

In one or more embodiments, for any of the figures herein, the device may center, stabilize, and anchor itself via magnetic action of the rotor and stators located beneath and/or around the water and the insulated floating platform. It may be desirable to anchor the central shaft and/or lower rotor to the bottom of the water, such as with a hub, swivel, ball joint, or other connection, possibly consisting of non-magnetic material not requiring additional lubrication. As a result, however, there may be friction and resistance from operation. Widening the proportions of the insulated floating platform, using stronger magnetic couplings, or increasing the weight of or around the rotor may improve device stabilization. An anchor may be achieved by having the central shaft extend through the rotor into a depression or "guide" in the water in which the shaft may rest without touching.

In one or more embodiments, to prevent heavy rainfall from entering the water, the parabolic reflector may be extended past the circumference of the water (e.g., a pool of water as in FIG. 2), a greenhouse/transparent outing covering may be used, or a donut-shaped lid may be provided over the pool with a sloped surface channeling water away from the device without preventing device operation and spin.

In one or more embodiments, additional rotors may be placed along the central shaft and/or the lower portion of the floating flywheel platform with matching stators located inside the walls of the pool of water (e.g., FIG. 2). Alternatively, the device may include only a single rotor located wherever practical.

In one or more embodiments, the device may be oriented to spin in either direction (e.g., clockwise or counter-clockwise), and may use the Coriolis effect of the appropriate hemisphere.

In one or more embodiments, the device may include a permanent non-removable and refillable fuel tank or rocket stove compartment instead of an interchangeable version.

In one or more embodiments, it may be desirable to use the device without the burner, using all solar heat or auxiliary heat from an alternate source.

In one or more embodiments, the device may agitate or direct water and its flow, such as for irrigation in place of or in addition to electrical energy production.

In one or more embodiments, the device may use a non-electrical application of its propulsion to power mechanical devices, such as for a mill.

In one or more embodiments, air ducts or stators may be used inside the lower firebox chamber to help direct airflow from the intake vents to the combustion chamber. The intake vents may overcome the centrifugal force that, around a fire, tends to slow the flow of oxygen inward toward the central fire. The air intake may be channeled further inward. The fire tornado created by the device may not rise indeterminately, but rather may strike the center of the diaphragm boiler and be forced outward, encountering centrifugal force and spreading across the surface of the boiler as air is forced out of the exhaust by the intakes and updraft of the combustion chamber.

In one or more embodiments, the device may be arranged to produce any alternating current (AC) or direct current (DC) voltage, phase, or the like as needed.

In one or more embodiments, instead of the intake vents and their turbines/turbine stators, the device may rely on the upward intake of the firebox port and chimney around the burner tank. In such embodiments, the exterior of the firebox may be sealed entirely.

In one or more embodiments, for temperature regulation and ability to ignite or deactivate the burner remotely, an electronic control valve, thermostat, rheostat, or emergency shutoff may be on or near the burner or fuel tank connected to a wireless handheld device or control panel (e.g., on an outer wall of the device).

In one or more embodiments, a mechanical valve, thermostat, rheostat, or emergency shutoff may be positioned on the burner or fuel tank to shut off the flow of fuel or heat when the temperature reaches a threshold temperature.

In one or more embodiments, to facilitate device mobility, any portion(s) of the device may have grips or other types of connections allowing for someone to grab and lift the components.

In one or more embodiments, diaphragm or coil boiler variants each have their own advantages, and certain shapes of diaphragm boilers such as rectangles and triangles may be more ergonomically efficient for sheet and plate metal reduction, for example.

In one or more embodiments, the portions of the water-spouts that operate above the water may be insulated for safety and/or to protect against wind chill.

In one or more embodiments, regarding materials, the solar collector diaphragm may be a thin springy material (e.g., a metal) capable of transferring heat to the medium inside the boiler. The solar oven may be transparent or opaque, should be durable to heat, water, and the elements, and should be able to withstand vacuum and/or high pressure under heat or have relief venting (e.g., pinholes, safety valves, and/or the like). The solar oven housing gasket may be flexible and durable to withstand motion and heat of operation while also cushioning the solar oven from vibration and providing a seal for the contents of the solar oven (e.g., silicone, rubber, or the like in material). The solar oven interior may be filled with regular air, gas, oil, liquid, or the like, under pressure or at least a partial vacuum. The coils (e.g., the coils 603 of FIG. 6) may be glass, copper, or another sturdy, corrosion-resistant, heat-conducive material. Borosilicate glass, for example, has a high melting point that may be suitable for the coils. When dying the water black, the dye should be non-toxic biodegradable dye to minimize risk to nearby wildlife and personnel, and to avoid issues with water disposal. The insulated flotation platform should be buoyant and insulative, possibly using a natural material such as cork and using a lighter reflective color and as frictionless as possible.

It is understood that the above descriptions are for purposes of illustration and are not meant to be limiting.

Figure 8:
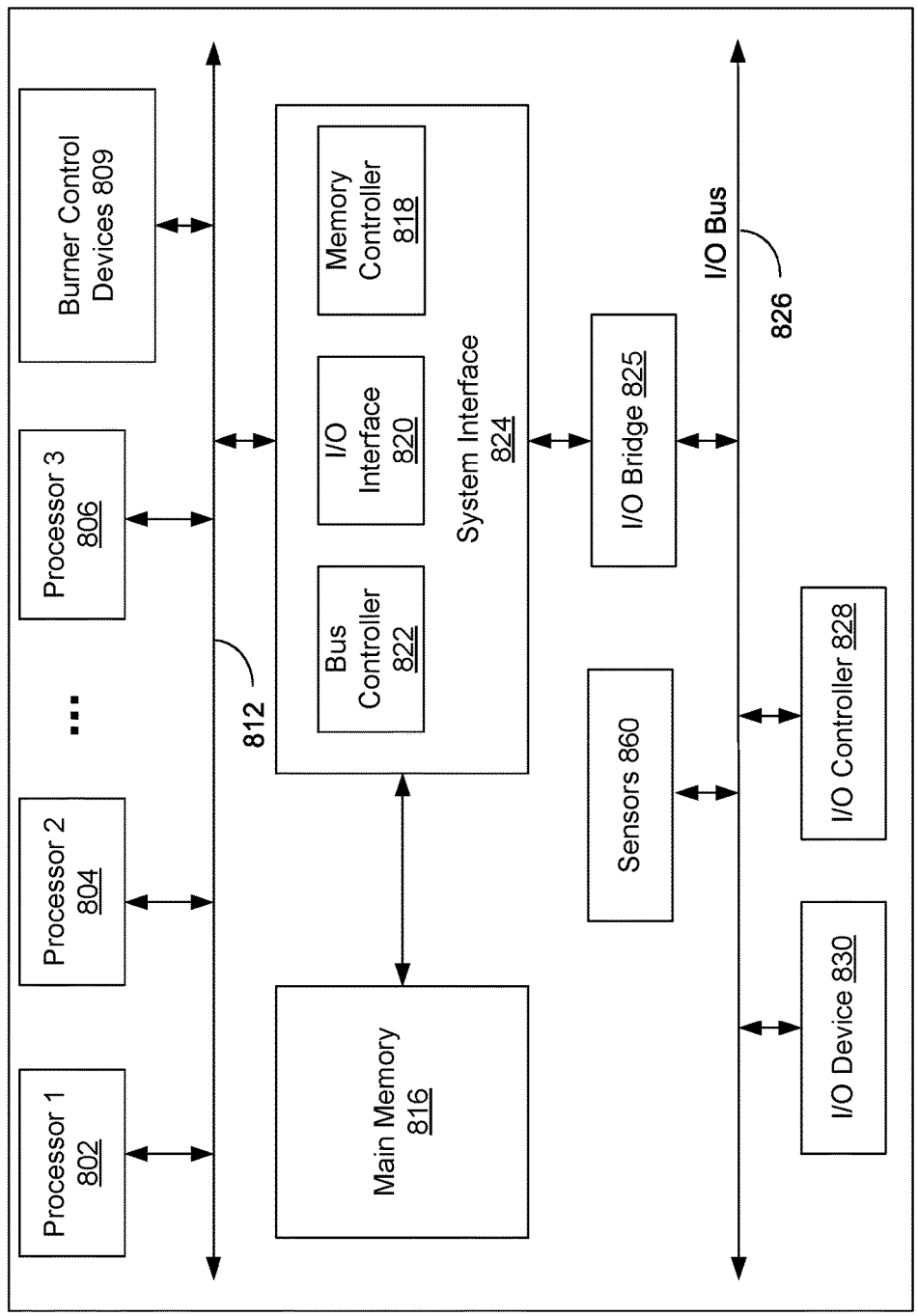
FIG. 8 is a diagram illustrating an example of a computing system that may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 be on or near the burner or fuel tank of the engines shown in the other figures, connected to a wireless handheld device or control panel (e.g., on an outer wall of the device). The computer system (system) includes one or more processors 802-806, one or more burner control devices 809 (e.g., with logic capable of generating signals to ignite or deactivate the burner remotely, to open and close any valves, and/or to open and close an emergency shutoff), and sensors 860 (e.g., to detect temperature such as at or in the burner so that the one or more burner control devices 809 may ignite/deactivate the burner based on its temperature, open/close valves, activate an emergency shutoff, etc.). Processors 802-806 may include one or more internal levels of cache (not shown) and a bus controller 822 or bus interface unit to direct interaction with the processor bus 812. Processor bus 812, also known as the host bus or the front side bus, may be used to couple the processors 802-806 with the system interface 824. System interface 824 may be connected to the processor bus 812 to interface other components of the system 800 with the processor bus 812. For example, system interface 824 may include a memory controller 818 for interfacing a main memory 816 with the processor bus 812. The main memory 816 typically includes one or more memory cards and a control circuit (not shown). System interface 824 may also include an input/output (I/O) interface 820 to interface one or more I/O bridges 825 or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system outlined in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A water engine for generating electricity, the water engine comprising:
   a boiler exposed to contact with sunlight;
   a solar oven configured to retain heat, from the contact between the boiler and the sunlight, with which the boiler is configured to heat a liquid to generate steam; and
   a spout extending from the boiler to the liquid, through which the steam passes from the solar oven to the liquid and through which the liquid passes to the solar oven.

2. The water engine of claim 1, further comprising a magnetic rotor configured to generate electricity by spinning in the liquid.

3. The water engine of claim 1, wherein the spout is a first spout, the water engine further comprising a second spout extending from the boiler to the liquid, through which the steam passes from the solar oven to the liquid and through which the liquid passes to the solar oven, wherein the first spout is oriented to pass the steam into the liquid in a first direction, and wherein the second spout is oriented to pass the steam into the liquid in a second direction.

4. The water engine of claim 3, further comprising a third spout extending from the boiler to the liquid, through which the steam passes from the solar oven to the liquid and through which the liquid passes to the solar oven, wherein the third spout is oriented to pass the steam into the liquid in a third direction different than the first direction and the second direction.

5. The water engine of claim 1, wherein the spout is circular in shape.

6. The water engine of claim 1, further comprising legs configured to stabilize the water engine.

7. The water engine of claim 1, further comprising a hydraulic paddlewheel or a mill.

8. The water engine of claim 1, further comprising a burner configured to heat the boiler.

9. The water engine of claim 8, further comprising at least one processor configured to control ignition and deactivation of the burner.

10. The water engine of claim 1, wherein the boiler comprises a coil.

11. The water engine of claim 1, wherein the solar oven is a first solar oven, the water engine further comprising a second solar oven within the first solar oven.

12. The water engine of claim 1, wherein the solar oven is transparent.

13. The water engine of claim 1, wherein the solar oven is non-transparent.

14. A system for generating electricity, the system comprising:
　a first water engine comprising:
　　a boiler;
　　a solar oven configured to retain heat, from sunlight, with which the boiler is configured to heat a liquid to generate steam;
　　a spout extending from the boiler to the liquid, through which the steam passes from the solar oven to the liquid and through which the liquid passes to the solar oven;
　a floating platform configured to float on the liquid;
　a magnetic rotor operationally connected to the floating platform and configured to generate electricity by spinning in the liquid; and
　a paddlewheel or turbine configured to drive the magnetic rotor.

15. The system of claim 14, further comprising a second water engine powered by the sunlight and operatively connected to the paddlewheel or turbine.

16. The system of claim 14, further comprising a burner configured to heat the boiler.

17. The system of claim 14, wherein the boiler comprises a coil.

18. The system of claim 14, wherein the solar oven is a first solar oven, the first water engine further comprising a second solar oven within the first solar oven.

19. A device for generating electricity, the device comprising:
　a boiler exposed to contact with sunlight;
　a solar oven configured to retain heat, from the contact between the boiler and the sunlight, with which the boiler is configured to heat a liquid to generate steam; and
　a spout extending from the boiler to the liquid, through which the steam passes from the solar oven to the liquid and through which the liquid passes to the solar oven.

20. The device of claim 19, wherein the spout is a first spout, the device further comprising a second spout extending from the boiler to the liquid, through which the steam passes from the solar oven to the liquid and through which the liquid passes to the solar oven, wherein the first spout is oriented to pass the steam into the liquid in a first direction, and wherein the second spout is oriented to pass the steam into the liquid in a second direction.

\* \* \* \* \*